Figure 13:
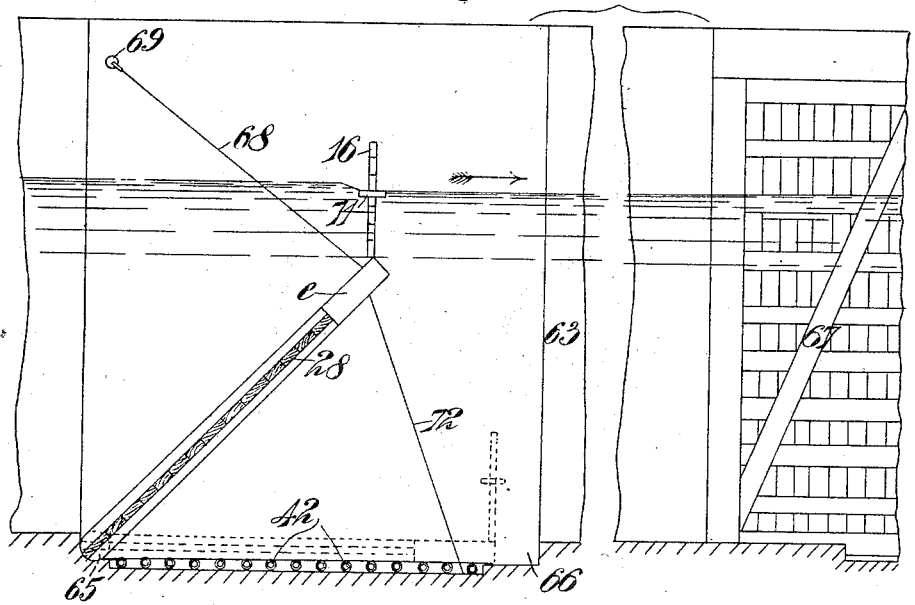

No. 726,316. PATENTED APR. 28, 1903.
C. E. LIVESAY.
APPARATUS FOR CONTROLLING FLOW OF WATER FROM RIVERS, &c., TO CANALS, DOCKS, OR OTHER HYDRAULIC WORKS.
APPLICATION FILED FEB. 19, 1900.
NO MODEL. 6 SHEETS—SHEET 1.
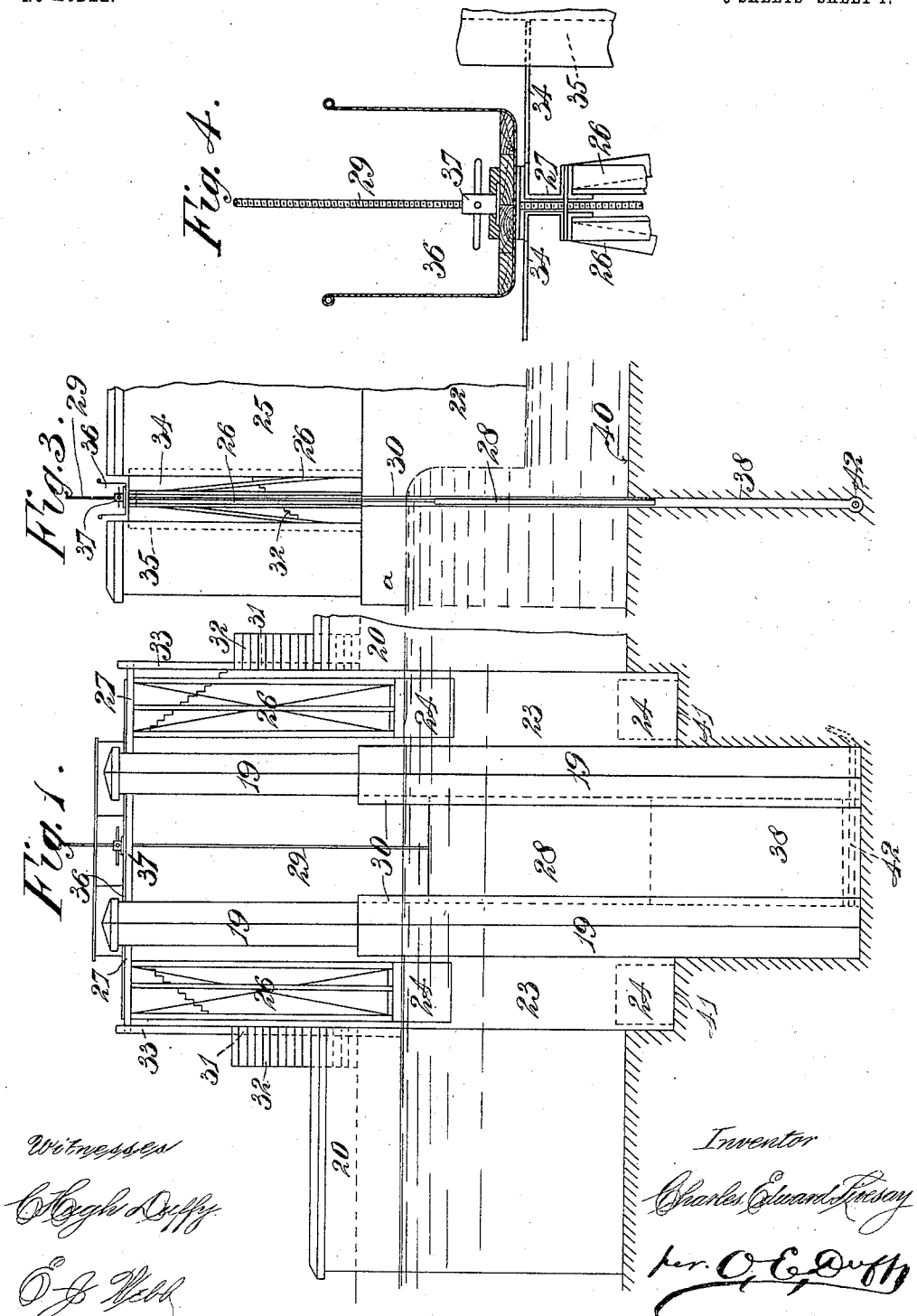

No. 726,316. PATENTED APR. 28, 1903.
C. E. LIVESAY.
APPARATUS FOR CONTROLLING FLOW OF WATER FROM RIVERS, &c., TO CANALS, DOCKS, OR OTHER HYDRAULIC WORKS.
APPLICATION FILED FEB. 19, 1900.
NO MODEL. 6 SHEETS—SHEET 2.
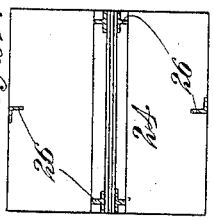
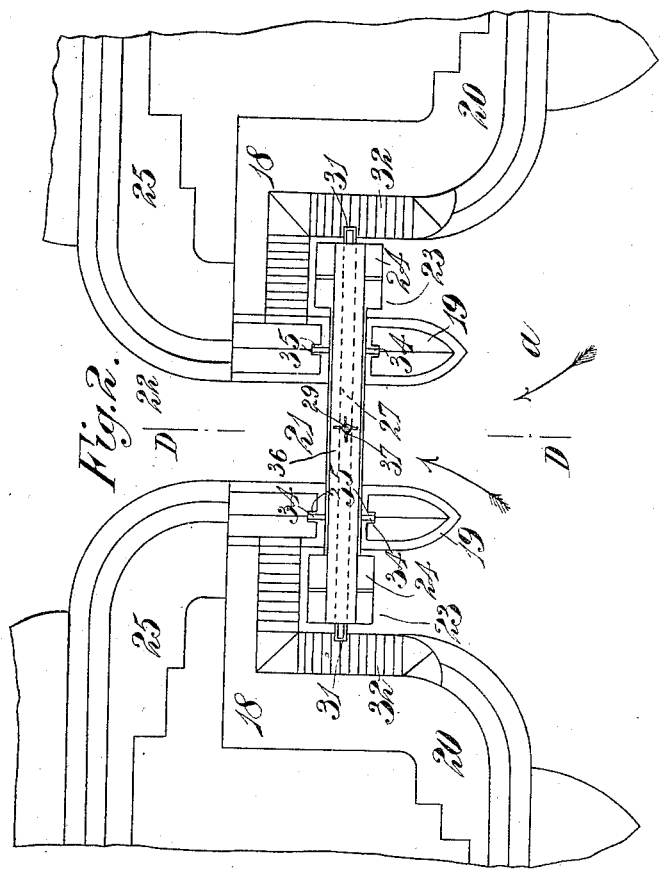

No. 726,316. PATENTED APR. 28, 1903.
C. E. LIVESAY.
APPARATUS FOR CONTROLLING FLOW OF WATER FROM RIVERS, &c., TO CANALS, DOCKS, OR OTHER HYDRAULIC WORKS.
APPLICATION FILED FEB. 19, 1900.
NO MODEL. 6 SHEETS—SHEET 3.
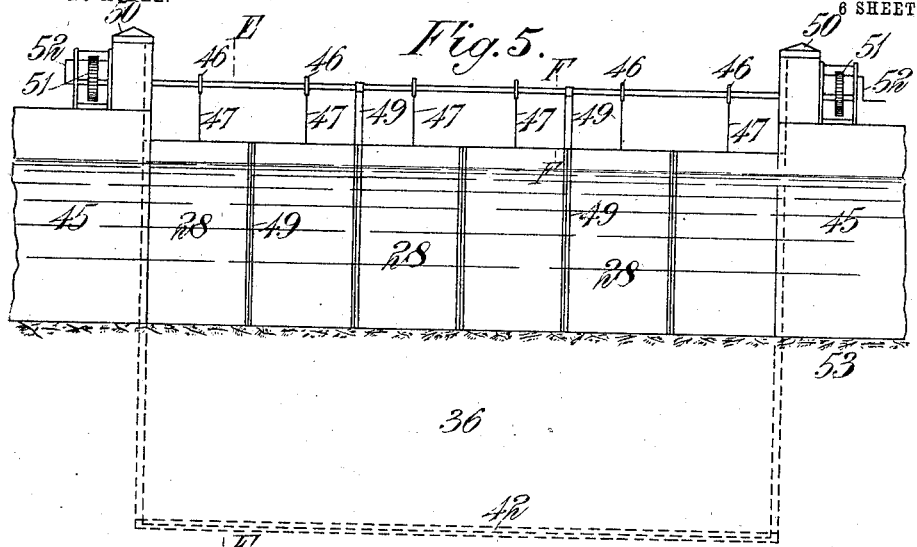
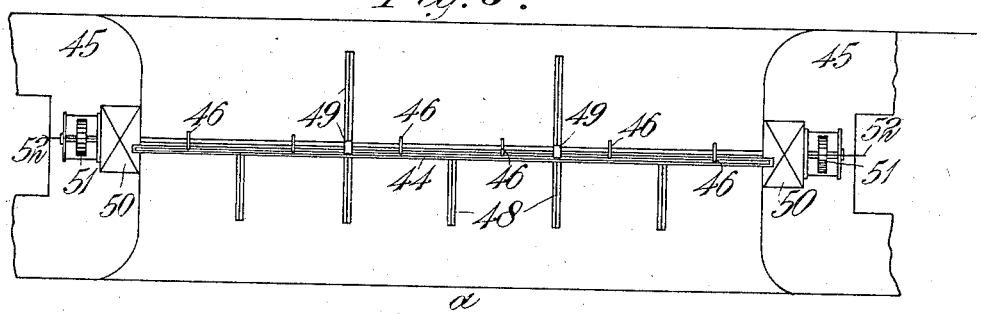
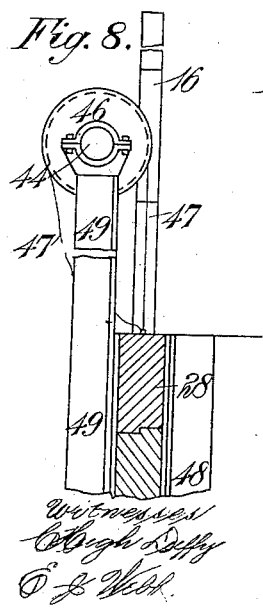
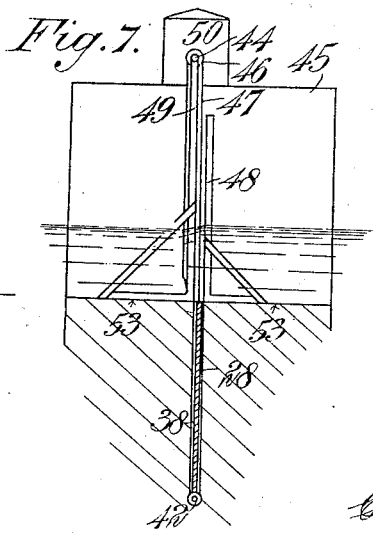
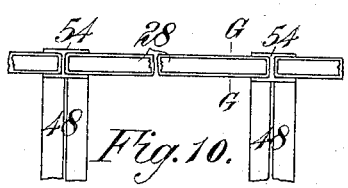
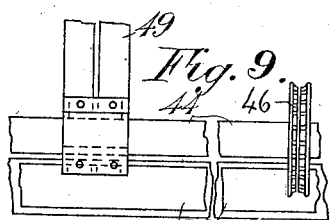

No. 726,316. PATENTED APR. 28, 1903.
C. E. LIVESAY.
APPARATUS FOR CONTROLLING FLOW OF WATER FROM RIVERS, &c., TO CANALS, DOCKS, OR OTHER HYDRAULIC WORKS.
APPLICATION FILED FEB. 19, 1900.
NO MODEL. 6 SHEETS—SHEET 4.
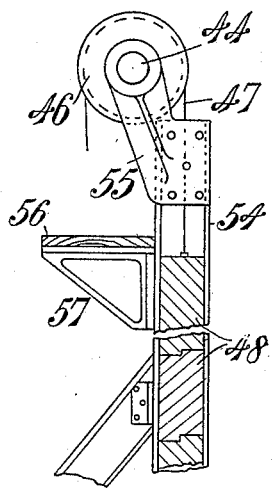
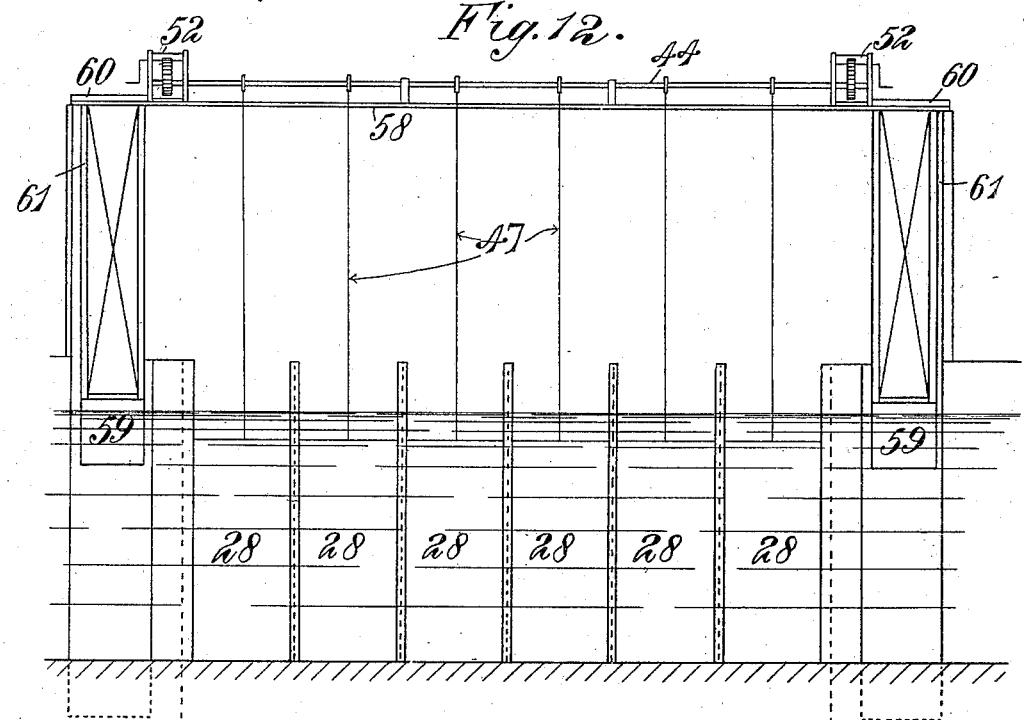

No. 726,316. PATENTED APR. 28, 1903.
C. E. LIVESAY.
APPARATUS FOR CONTROLLING FLOW OF WATER FROM RIVERS, &c., TO
CANALS, DOCKS, OR OTHER HYDRAULIC WORKS.
APPLICATION FILED FEB. 19, 1900.
NO MODEL. 6 SHEETS—SHEET 5.

UNITED STATES PATENT OFFICE.

CHARLES EDWARD LIVESAY, OF EALING, ENGLAND.

APPARATUS FOR CONTROLLING FLOW OF WATER FROM RIVERS, &c., TO CANALS, DOCKS, OR OTHER HYDRAULIC WORKS.

SPECIFICATION forming part of Letters Patent No. 726,316, dated April 28, 1903.

Application filed February 19, 1900. Serial No. 5,745. (No model.)

*To all whom it may concern:*

Be it known that I, CHARLES EDWARD LIVESAY, a subject of the Queen of Great Britain and Ireland, residing at Castle Hill, Ealing, in the county of Middlesex, England, have invented Improvements in Means or Apparatus for Controlling the Flow of Water from Rivers and other Waterways to Canals, Docks, or other Hydraulic Works, of which the following is a specification.

I have found by experiment that the density of silt held in suspension in river and other water increases with the depth thereof from the surface where it is least, and this invention has reference to improved means or apparatus designed to enable the supply of water from a river or other source of supply (hereinafter called a "river") to canals, docks, and other hydraulic works to be drawn from or as near as possible to the surface of the river where the quantity of silt is least, so as to thereby exclude the passage of the larger quantity of silt contained in the water at a greater depth. The means or apparatus used for this purpose, according to this invention, comprises a water-controlling device arranged between the two waterways, so as to separate the one from the other, excepting over its upper end, and having its upper end adapted to be brought below the lowest water-level in the waterway to which water is to flow, so as to be available for use at different stages of the tide in the river, and means for moving the said device bodily, so as to raise and lower its upper end relatively to the level of the river. Such a water-controlling device and the means for supporting and operating the same can be constructed and arranged in various ways to suit particular applications.

The invention consists, therefore, in certain novel features of construction and in various combinations and arrangements of parts hereinafter more particularly described and enumerated in the claims.

Figure 14:
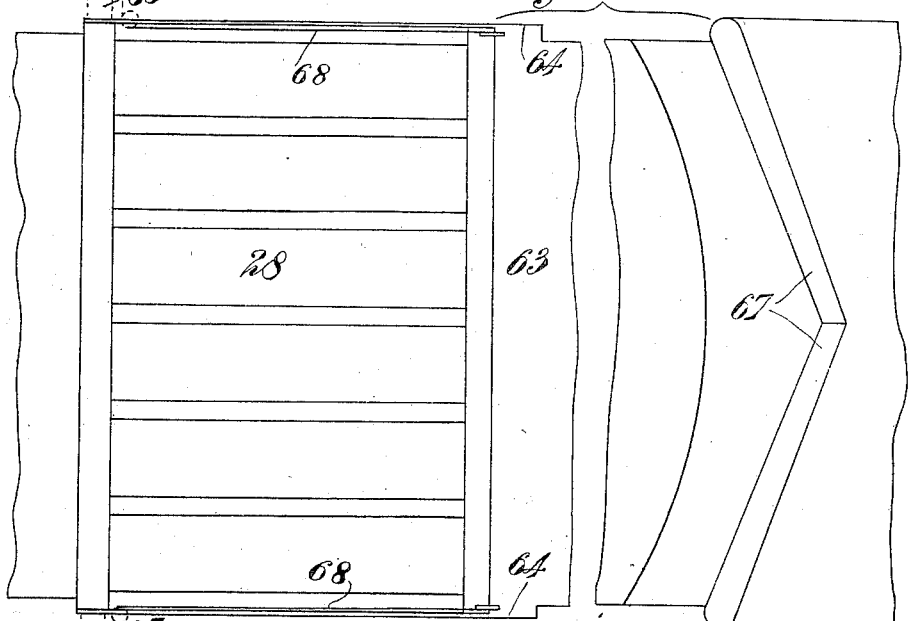
Figure 15:
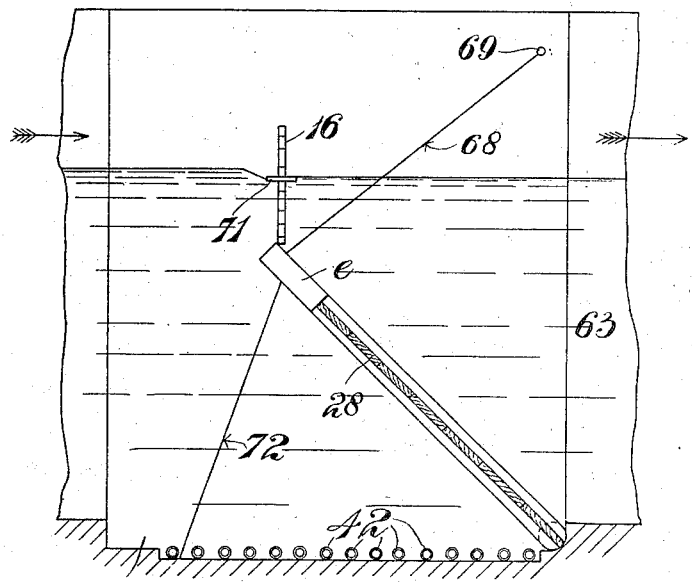
Figure 16:
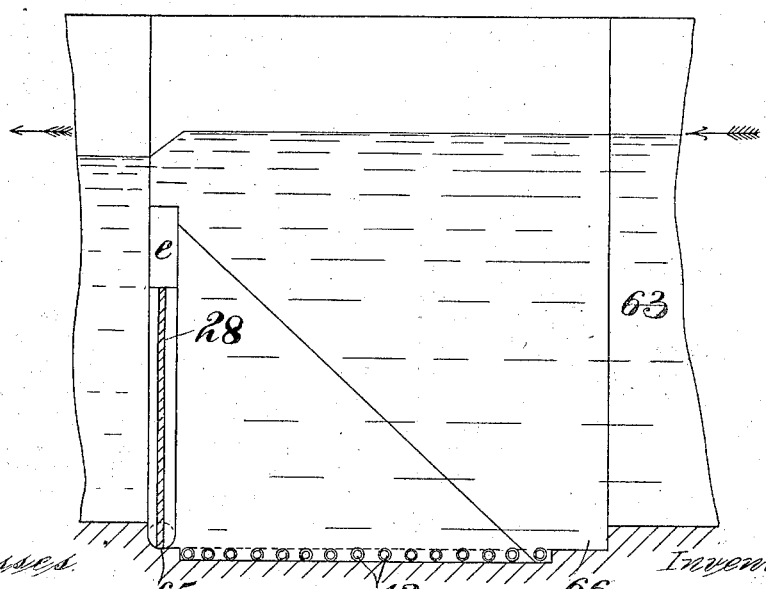

In the accompanying illustrative drawings, Figures 1, 2, and 3 show an arrangement of apparatus suitable for controlling the flow of water from a river to a canal, Fig. 1 being a front view as seen from the river, Fig. 2 a plan, and Fig. 3 a vertical section on the line D D of Fig. 2. Figs. 4 and 4ª are enlarged detail views. Figs. 5 and 6 show, respectively, in front elevation and plan an arrangement of apparatus suitable for controlling the flow of water from a river to docks. Fig. 7 is a cross-section on the line E E of Fig. 5. Fig. 8 is a cross-section corresponding to the line F F of Fig. 5, but drawn to a larger scale; and Fig. 9 is a corresponding part plan. Fig. 10 is a part plan, and Fig. 11 a part cross-section on the line G G of Fig. 10, showing a modification. Fig. 12 is an elevation as seen from the dock side, showing a modified arrangement of the apparatus. Fig. 13 is a longitudinal section, and Fig. 14 a plan, showing an arrangement of apparatus suitable for use in connection with the entrance-locks of docks. Figs. 15 and 16 are similar views to Fig. 13, showing modified arrangements.

In one construction of the apparatus suitable for controlling the passage of water from a river to a canal the apparatus comprises a shutter (or there may be more than one) arranged to slide in penstock-grooves in masonry piers or iron standards, so as to allow of the supply of water passing from the river over its top instead of, as is usual, under its bottom, the shutter being actuated by floats which rise and fall with the river, so as to insure a uniform discharge being maintained in all states of the river, and being provided with means for adjusting its position vertically independently of the floats, the depth of the discharge-water passing over its upper end depending upon the depth below the level of the river to which the top edge of the shutter is adjusted. In one arrangement of this kind (shown in Figs. 1 to 4ª, inclusive) the masonry 18 of the head-sluice is built to form on the river side abutment-piers 19 and the wing-walls 20, so designed as to form between them on opposite sides of the waterway 21, connecting the river *a* and canal 22, and on the river side of the piers or wing-walls, compartments or wells 23, in which are located floats 24, the masonry being also arranged to form wing-walls 25 on the canal side, as usual. The floats 24 are provided with standards 26, which may, as shown, be open-work metal frames that carry a raised cross-girder 27, from which the shutter 28 is suspended by a vertically-adjustable screw-threaded rod 29. The shutter 28 works in vertical grooves 30, formed in the piers 19. The ends of the girder 27 slide in guideways 31, that are formed in the adjacent sides of steps 32, and in vertical channel-irons 33, carried by the masonry 18, and serve to prevent endwise and lateral movement of the girder. To further assist in preventing such movement of the girder 27, there is or may be fixed to the girder lateral plates 34, that work in grooves 35 in the abutment-piers 19. Above the girder is a gangway 36, the ends of which are accessible from the steps 32 in all states of the river. By means of this gangway access can be gained to the mechanism 37, used for adjusting the height of the shutter 28, so that any required depth of water can be passed over the top edge thereof. As will be seen, the arrangement is such that when the river a falls the shutter 28 slides into a socket 38, Fig. 3, arranged below the bed 40 of the canal 22, and when entirely within that socket the floats 24 come to rest on the bottoms 41 of the compartments or wells 23, in which they work, the waterway 21 between the river and canal being then entirely open, and that by raising the shutter 28 the discharge from the river to the canal can be wholly cut off at any state of the river. At the bottom of the socket 38 is a perforated pipe 42, that is connected to a source of water under pressure, by means of which the socket can be flushed periodically, so as to remove silt deposited therein.

Any desired number of consecutive or parallel shutters can be employed to increase the discharge, the several shutters being suspended from a girder actuated by floats, as described, and held in place by iron standards or struts of I-section, as in an arrangement hereinafter described, or by three or more masonry piers like 19, Figs. 1 and 2, arranged between the abutments or wing-walls.

In another construction suitable for use with docks, the entrance-locks of which are fitted with reverse-gates to exclude the river, the water-controlling apparatus is arranged to control the passage of water from the river to the docks through a waterway independent of the entrance-locks and comprises a continuous or wide shutter or several consecutive narrower shutters arranged to slide in penstock-grooves in masonry abutments or piers or in iron struts or standards and suspended from a rotary shaft controlled by winches connected to the ends thereof, the arrangement being such that by rotating the shaft the top of the shutter or shutters can be raised or lowered, so as to fill the docks to high-water level in a given time, and that the upper end of the shutter or shutters can be moved to a position below the lowest water-level that will obtain in the docks, so that the apparatus will be available for efficient use at different levels of the river and not merely for high spring-tides. The shaft may be carried by masonry abutments or piers or by a girder supported by floats, so as to work automatically, as in the arrangement last herein described, the floats, however, being arranged on the dock side of the shutter. In one arrangement of this kind (shown in Figs. 5 to 9, inclusive) the shaft 44 is carried by masonry abutments 45 and is provided with a number of pulleys 46, around which extend chains 47, connected to the shutter 28, which is made as a wide continuous shutter and is supported on each side by iron or other suitable struts 48 49, so as to resist the water-pressure both when the docks are being filled and when the docks are full. The shaft 44 passes through pillars 50, carrying bearings, and is furnished at its ends with toothed wheels 51, which are adapted to be rotated by winches 52, so as to wind up or pay out the chains 47, and so raise or lower the shutter. The chains 47 may be counter-sunk into the pulleys 46, Fig. 9, so as to gear therewith and be connected at both ends to the shutter 28, (see Fig. 8,) their length being such as to admit of the shutter being lowered as a whole entirely below the sill 53 into a socket or recess 38, provided with a flushing-pipe 42, as before. The chains 47 may, however, be connected to the pulleys in any other suitable way. The level of the sill 53 is fixed at the depth below lowest water-level in the docks at which it is calculated that the discharge should be admitted over the shutter to fill the docks within a certain time. The supporting-struts 49 for the shutter 28 are made high enough to support the rotary shaft 44 at suitable points between the pillars 50.

The method of working the apparatus is as follows: When the water in the river a has risen to the same height as the water in the docks, the shutter 28 is lowered to the depth it is intended to pass the supply, this depth being read off on a suitable gage 16, carried by the shutter. As the river rises the shutter 28 is raised by rotating the shaft 44, so as to maintain the desired depth, and when the river has attained the highest level for that tide the shutter is raised about a foot higher, so as to impound the water taken in. Instead of a single continuous shutter the same result can be achieved by separate consecutive shutters 28, (see Fig. 10,) arranged between struts 48, having vertical portions 54, made of I or double-channel section, so as to form grooves to hold the shutters 28 in place. In this case the struts 49 on the dock side, Figs. 5 to 9, are not required, and the rotary shaft 44 may be supported by brackets 55, Fig. 11, fixed to the portions 54 of the struts 48 on the river side at suitable intervals. The socket 38 below the regulator-sill is in this case divided into compartments to receive each shutter separately. By this construction any required breadth of waterway may be obtained, masonry or other piers being introduced at intervals to carry additional winches, if necessary. The rotary shaft 44, from which the shutters are suspended, may also be worked by hydraulic or other power, and a footway 56, supported by brackets 57 on portions 54 of the struts 48, Fig. 11, may be provided, so as to afford ready access to the bearings, pulleys 46, and other parts.

In the modified arrangement shown in Fig. 12 the rotary shaft 44 is carried by a girder 58, the ends of which are supported by floats 59 in the dock-basin, so as to rise and fall with the water in the dock. When winches 52 are also employed, as shown, to adjust the position of the upper ends of the shutters 28 relatively to the surface of the water, they may be carried by platforms 60 on the standards 61, supporting the girder 58 on the floats 59. Once lowered to the proper depth to admit the supply of water from the river the floats raise the shutters automatically as the dock-level rises and maintain the original depth of supply until the docks are filled to the desired extent, when the shutters are finally lifted to impound the supply.

In another construction, suitable for use where the entrance-locks of docks are not fitted with reverse-gates to exclude the river, the water-controlling apparatus comprises a shutter the lower end of which is hinged or pivoted below the floor-level of the entrance channel or lock and the upper or free end of which is lifted by chains extending from the side walls of the entrance channel or lock or by a float, so as to pass only a certain depth of water over its top to fill the docks within a specified time. Figs. 13 and 14 show one arrangement of this kind. The shutter 28 is made slightly wider than the width of the entrance channel or lock 63, its sides extending into recesses 64 in the side walls thereof and its lower end being secured at or below the floor of the entrance channel or lock by trunnions or journals 65, that extend under the side walls, the arrangement being such that the shutter when not in use can be folded down into a recess 66 in the floor of the entrance channel or lock, so that when in that position it will be below such floor. The recess 66 is provided with perforated pipes 42, by which it can be periodically flushed to keep it clear of silt, especially during the time the shutter is raised and working. When the tide rises and before the gates 67 open, the shutter 28 is lifted either by its chains 68, worked by hydraulic or other power and passing through holes 69 in the side walls of the entrance lock or channel, or by a float e, or by both these means combined, until its top edge is at a certain depth below the surface of the water, at which depth the supply is intended to be admitted to fill the dock. As the tide rises the shutter is raised to maintain that depth, a gage 16, hinged to the top of the shutter 28 and kept vertical by a float 71, serving to indicate the depth of water passing. After the lock-gates 67 are closed the shutter is folded down into its recess 66.

When a float e is employed to raise the shutter, as shown, it may be contained in a box or hollow girder, which would also strengthen the shutter. In this case chains 72, extending from the lower side of the shutter and worked by hydraulic or other power, are released to allow the shutter to rise automatically until the gage 16 shows that the required depth of water above the top edge of the shutter is attained, the chains 68, extending from the upper side of the shutter, being at the same time drawn in, so as to thereby prevent the shutter from being unduly depressed by the discharge over its top. As the river continues to rise the chains 72 are let out and the others, 68, drawn in, so as to maintain the required depth of supply over the shutter. Finally, when the dock is filled and the lockgates 67 closed the shutter 28 is drawn down into its recess 66 by the chains 72 and held in that position until the next high tide. The shutter 28 may be arranged to fold down and work in the direction of the dock or downstream, as shown in Figs. 13 and 14. It may also be fitted so as to fold down and work in the direction of the river or upstream, as shown in Fig. 15, or it may be allowed to assume a vertical position when passing the desired supply of water, the sides of the shutter abutting against the side walls of the entrance channel or lock, as shown in Fig. 16. In each case the chains 72 for drawing down the shutter will usually only be required to retain the shutter in any position for discharge, the float as well as the discharge of water serving or tending to lift it.

In each case it will be seen that the vertically-adjustable shutter is available for use at different stages of the tide in the river and that it acts at all times to keep back the siltladen water, while permitting of the passage over its upper end of water that is near the surface of the river and is consequently comparatively free from silt.

It will be evident that various changes can be made in the details of construction of the apparatus without departing from the spirit and scope of the invention so long as the relative arrangements of parts shown in the drawings or the mode of operation described in the specification is preserved.

What I claim is—

1. In apparatus for controlling the flow of water from one waterway to another, the combination of one or more imperforate bodies arranged to extend from one side to the other of one of said waterways and adapted to separate the two waterways from each other either entirely in any state of either waterway or excepting over its or their upper portion or portions which is or are arranged to rise and fall, and a float permanently connected to and adapted to raise and lower the upper portion of said body or bodies with the rise and fall of the water in one of said waterways.

2. For controlling the flow of water from a river to a canal, dock or other waterway, the combination with the two waterways, of a water-controlling device adapted to separate the two waterways from each other either entirely in any state of either waterway or excepting over its upper end and comprising one or more imperforate shutters, arranged to rise and fall in a vertical plane, and a float permanently connected to said shutter or shutters and arranged to be acted upon by the water in one of said waterways and to automatically raise and lower said shutter or shutters as the water in such waterway rises and falls.

3. For controlling the flow of water from a river to a canal, dock or other second waterway, the combination with the two waterways, of an imperforate shutter arranged transversely between the two waterways so as to separate the one from the other excepting over its upper end and to move vertically in its own plane, a support arranged above said shutter, floats arranged in one of said waterways and by which said shutter is carried, and adjustable suspension means whereby said shutter is carried from said support and whereby said shutter can be raised and lowered above the highest or below the lowest level of either waterway independently of said floats, substantially as described for the purpose specified.

4. For controlling the flow of water from a river to a canal, dock or other second waterway, the combination with the two waterways, of a transverse vertical socket, an imperforate shutter arranged transversely between the two waterways so as to separate the one from the other excepting over its upper end and to move vertically in said socket, a support arranged above said shutter, floats arranged in one of said waterways and by which said shutter is carried, and adjustable suspension means whereby said shutter is carried from said support and whereby said shutter can be raised and lowered independently of said floats above the highest or below the lowest level of either waterway, substantially as described for the purpose specified.

5. For controlling the flow of water from a river to a canal, dock or second waterway, the combination with the two waterways, of a transverse vertical socket extending downward from the bed of the second waterway and closed at its lower end, an imperforate shutter arranged transversely between the two waterways so as to separate the one from the other either entirely in any state of either waterway or excepting over its upper end and to move vertically in said socket, said socket being made of a depth at least approximately equal to that of said shutter and means located above said shutter for raising and lowering the same relatively to the level of either waterway, substantially as described.

6. For controlling the flow of water from a river to a canal, dock, or second waterway, the combination with the two waterways, of a transverse vertical socket closed at its lower end and provided with means for flushing the same, an imperforate shutter arranged transversely between the two waterways so as to separate the one from the other either entirely in any state of either waterway or excepting over its upper end, and to move vertically in said socket, said socket being made of a depth at least approximately equal to that of said shutter and rotary mechanism located above said shutter for raising and lowering the same relatively to the level of either waterway, substantially as described.

7. For controlling the flow of water from a river to a canal, dock or other second waterway, the combination with the two waterways, of a transverse vertical socket, an imperforate shutter arranged transversely between the two waterways so as to separate the one from the other excepting over its upper end and to move vertically in said socket, lateral guideways adapted to guide said shutter vertically, fixed intermediate stays arranged at intervals across one of said waterways and adapted to support said shutter in directions at right angles to its width, and means for raising and lowering said shutter relatively to the level of either waterway, substantially as described.

8. For controlling the flow of water from a river to a canal, dock or other second waterway, the combination with the two waterways, of a transverse vertical socket, an imperforate shutter arranged transversely between the two waterways so as to separate the one from the other excepting over its upper end and to move vertically in said socket, lateral and intermediate vertical guideways adapted to guide said shutter vertically and to support the same at intervals across its width, and means for raising and lowering said shutter substantially as described.

9. For controlling the flow of water from a river to a canal, dock or other second waterway, the combination with the two waterways, of an imperforate shutter arranged transversely between the two waterways so as to separate the one from the other excepting over its upper end and to move vertically, said shutter being made in two or more vertical parts arranged side by side, vertical guideways adapted to guide and support the several parts of said shutter, vertical sockets arranged to receive said parts of the shutter when the same are lowered, and means for raising or lowering the several parts of said shutter simultaneously, substantially as described.

10. For controlling the flow of water from a river to a canal, dock or other second waterway, the combination with the two waterways, of a transverse vertical socket, an imperforate shutter arranged transversely between the two waterways so as to separate the one from the other excepting over its upper end and to move vertically in said socket, a rotary shaft arranged above said shutter and provided with a plurality of pulleys, a plurality of flexible connections secured at intervals to the upper part of said shutter and passing over and engaging with said pulleys, and means for rotating said rotary shaft, substantially as described.

11. For controlling the flow of water from a river to a canal, dock or other second waterway, the combination with the two waterways, of a transverse vertical socket, an imperforate shutter arranged transversely between the two waterways so as to separate the one from the other excepting over its upper end and to move vertically in said socket, floats arranged at opposite sides of the second waterway, standards carried by said floats, a transverse support connected to the upper ends of said standards and located above said shutter, means whereby said shutter is suspended from said transverse support, and means for raising and lowering said shutter through said suspension means, substantially as described.

12. For controlling the flow of water from a river to a canal, dock or other second waterway, the combination with the two waterways, of an imperforate shutter arranged transversely between the two waterways so as to separate the one from the other excepting over its upper end and to move vertically in said socket, said shutter being made in one or more parts, a transverse vertical socket made in one or more vertical parts and capable of receiving said shutter when lowered, vertical float compartments or wells formed in the masonry at opposite sides of one of said waterways and adjacent to said shutter, floats arranged to work vertically in said compartments or wells, a transverse support arranged above said shutter and carried by said floats, and means connecting said transverse support and shutter and whereby the latter can be raised or lowered at will, substantially as described.

13. For controlling the flow of water from a river to a canal, dock or other second waterway, the combination with the two waterways, of a transverse vertical socket extending downward from the bed of the second waterway, means for flushing said socket, an imperforate shutter arranged transversely between the two waterways so as to separate the one from the other excepting over its upper end and to move vertically in said socket, float compartments or wells arranged at opposite sides of the second waterway, floats located in said float-compartments, standards carried by said floats, a rotary shaft carried by said standards, extending transversely above said shutter, and provided with a number of pulleys, flexible connections connected to said shutter and passing upward over and engaging said pulleys, and means for rotating said shaft and pulleys and raising or lowering said shutter, substantially as described for the purposes specified.

Signed at 77 Cornhill, in the city of London, England, this 7th day of February, 1900.

CHARLES EDWARD LIVESAY.

Witnesses:
 WM. O. BROWN,
 EDMUND S. SNEWIN.